United States Patent
Fawaz

(10) Patent No.: US 8,332,330 B2
(45) Date of Patent: *Dec. 11, 2012

(54) SYSTEM AND METHOD FOR PROVIDING REAL ESTATE REFERRALS

(76) Inventor: Mazen N. Fawaz, Birmingham, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/417,461

(22) Filed: Mar. 12, 2012

(65) Prior Publication Data

US 2012/0173306 A1    Jul. 5, 2012

Related U.S. Application Data

(63) Continuation of application No. 12/243,047, filed on Oct. 1, 2008, now Pat. No. 8,140,443.

(51) Int. Cl.
*G06Q 50/00* (2012.01)
*G06Q 10/00* (2012.01)

(52) U.S. Cl. ........ 705/313; 705/7.14

(58) Field of Classification Search .......... 705/313–316, 705/7.11–7.14, 7.16, 7.21–7.26, 26.35–26.5, 705/28–30, 1.1
See application file for complete search history.

(56) References Cited

U.S. PATENT DOCUMENTS 6,438,539 B1 * 8/2002 Korolev et al. .......... 1/1
2003/0229504 A1 * 12/2003 Hollister .......... 705/1

* cited by examiner

*Primary Examiner* — Igor Borissov
(74) *Attorney, Agent, or Firm* — Frederick W. Mau, II

(57) ABSTRACT

The present invention discloses a system and method for providing agent referrals for real estate transactions. The system and method provides buyers and/or sellers with a real estate agent referral based on the type of real estate involved in the transaction and/or preferences of the buyer/seller. The real estate agent provided through the referral will be the highest performing real estate available with the performance of the real estate agent based on criteria received from the seller/buyer and transaction history of the real estate agent.

26 Claims, 4 Drawing Sheets

SYSTEM AND METHOD FOR PROVIDING REAL ESTATE REFERRALS

CROSS REFERENCE TO RELATED APPLICATIONS

The present application is a continuation of, and is entitled to the benefit of the earlier filing date and priority of, U.S. patent application Ser. No. 12/243,047 entitled "SYSTEM AND METHOD FOR PROVIDING REAL ESTATE REFERRALS," filed Oct. 1, 2008 now U.S. Pat. No. 8,140,443, the disclosure of which is hereby incorporated by reference.

FIELD OF THE INVENTION

The present invention generally relates to systems and methods for providing agent referrals. More particularly, the present invention relates to a system and method for providing agent referrals for real estate transactions.

BACKGROUND

The purchase or sale of real estate is a very complex transaction whether involving a commercial or residential property. Such transactions typically involve a large sum of money and many different variables that must be taken into consideration prior to closing. For most people a real estate transaction can be one of the most important transactions in their life. Based on the complexity and nature of real estate transactions buyers and sellers typically utilize real estate agents to manage many of the details of the transaction and ultimately close the sale of the real estate. As such, it is important that the buyer or seller utilize an agent which is experienced with the type of real estate involved in the transaction as well as the many details involved. It is also very important that the real estate agent be able to effectively communicate and develop a good relationship with their client such that the client may be effectively served.

With the need for buyers and sellers to have an experienced real estate agent representing them in the real estate transactions, buyers and sellers often use referrals to select a particular real estate agent. By utilizing a referral, a buyer or seller can be somewhat assured that they are utilizing a reputable agent based on the relationship of the buyer/seller with the referring entity. This helps alleviate the uncertainty factor in the mind of the buyer/seller when selecting a real estate agent at random. Such referrals may be provided through a personal contact or a reputable company which provides real estate agent referrals.

Many companies that provide real estate referrals utilize methods and systems which help match a buyer/seller with a real estate agent. An example of one type of referral system is described in U.S. Pat. No. 6,883,002 to Faudman. Faudman describes a system and process which maintains a database of MLS properties for sale. Real estate agents subscribe to the system and are included into the database with their information. Prospective buyers or sellers then enter the system by submitting a commitment form with personal information and the type of property involved. Upon entering the system, the subscribing real estate agents may then view the information of prospective buyers and sellers and post properties for sale.

Another type of system is disclosed in U.S. Pat. Pub. No. 2004/0088172 to Baglioni. Baglioni describes a method and apparatus for real estate agent selection. The method and apparatus described by Baglioni ranks real estate agents based on performance and provides a referral of the highest ranking real estate agent to potential clients. The performance of the real estate agents is determined based on earnings over a designated time period. If the customer is dissatisfied with the referred real estate agent, feedback from the customer may be used to reevaluate the ranking of the referred agent.

While there are various systems and methods currently known for providing referrals, particularly real estate referrals, such systems and methods fail to take into consideration the performance of the real estate agents with respect to the many details of specific properties and the transactions associated therewith. As such, there is a need in the art for a system and method which provides an agent referral for real estate transactions that takes into account the specific details for each real estate transaction.

SUMMARY OF THE INVENTION

Disclosed herein, is a method for referring a real estate agent comprising the steps of receiving information from a buyer or seller relating to a real estate property, receiving performance data for two or more real estate agents, ranking two or more real estate agents based on the information received from the buyer or seller and performance data of the two or more real estate agents whereby the performance data includes two or more categories of performance data, and providing a referral to the buyer or seller for the highest performing real estate agent based on availability.

The ranking of two or more real estate agents based on performance may be performed by the steps of selecting a main category from the two or more categories of performance data of the two or more real estate agents and filtering the performance data based on information received from the buyer or seller such that the two or more real estate agents are ranked by the main category throughout filtering. The main category selected from the performance data of the two or more real estate agents may be volume of sales.

The rankings of the two or more real estate agents based on performance may be refined based on the preferences of the buyer or seller. The rankings of the two or more real estate agents may be refined by calculating a performance matching value (PMV) for each ranked real estate agent indicative of how well the characteristics of the ranked real estate agent match the preferences of the buyer or seller and refining the ranking of each real estate agent with the performance matching value (PMV) to provide a new ranking of real estate agents. The performance matching value (PMV) may be calculated by the equation:

$$PMV = \frac{(PR_1 * ACV_1) + (PR_2 * ACV_2) + (PR_3 * ACV_3) + \ldots + (PR_z * ACV_z)}{PR_1 + PR_2 + PR_3 + \ldots + PR_z},$$

wherein PR equals a preference rating provided by buyer or seller, ACV equals an agent characteristic value indicative of a characteristic of the real estate agent matching a preference of the buyer or seller, and n equals the number of preferences provided by the buyer or seller. ACV may be equal to 0 or 1 based on whether or not the agent characteristic matches the preference of the buyer. The performance matching value may also be a percentage which represents the percentage of characteristics of the real estate agent which match the preferences of the buyer or seller, whereby the performance matching value is multiplied by the all of the rankings of the ranked real estate agents to provide a refined real estate agent ranking. The refinement of the real estate agent rankings may be performed on the top X % of the ranked real estate agents and X may be in the range of 5 to 50 percent. Preferably, X may be in the range of 10 to 25 percent.

The performance data of two or more real estate agents may be received by the steps of extracting the real estate agent performance data from one or more databases of real estate agent information via one or more data extraction adaptors, normalizing the extracted real estate performance data into a common format, and storing the normalized real estate performance data into a central database.

The information received from the buyer or seller may be confirmed via a follow up communication from the real estate referral provider to the buyer or seller once the information is received from the buyer or seller. A fee may be charged to the real estate agent referred to the buyer or seller by the real estate agent referral provider.

The referral method may further comprise the step of utilizing an agent interview filter prior to providing the referral to the buyer or seller. The agent interview filter may confirm one or more types of information selected from availability of the agent, willingness of agent to enter into agreement with referral service provider, willingness of agent to perform service, and responsiveness of agent.

The information received from the buyer or seller may comprise one or more types of data selected from the address of the property, type of property, current listing price of property, desired listing price, time property has been on the market, and the name of current property owner, full name of buyer or seller, address of buyer or seller, age of buyer or seller, nationality of buyer or seller, phone number of buyer or seller, email address of buyer or seller, and desired closing date. The performance data may comprise one or more types of data selected from total volume of sales, total volume of sales of properties within a given price range, time to effect a sale, number of years experience, listing price versus selling price, type of property, feedback from clients, feedback from other real estate agents, and responsiveness. The information received from the buyer or seller may comprise the preferences of the buyer or seller regarding the type of real estate agent referred to the buyer or seller. The preferences of the buyer or seller may comprise one or more selected from fluency of real estate agent in a particular language, family status of the real estate agent, gender of the real estate agent, ethnicity of the real estate agent, age of the real estate agent, and whether or not the real estate agent is a pet owner.

Also disclosed herein is a method for providing real estate information comprising the steps of identifying one or more sources for real estate information, extracting the real estate information from two or more real estate information databases, normalizing the real estate information into a common format, storing the real estate information in a centralized database, and providing the normalized real estate information to one or more end users. The real estate information may be extracted from the two or more real estate information databases via one or more data extraction adapters, whereby each of the data extraction adapters interfaces with one or more of the real estate information databases. The one or more data extraction adapters may be configured to extract data from and provide data to each real estate information database with which it is interfaced. The data stored in the centralized database may also be stored in encrypted format.

DETAILED DESCRIPTION OF THE PREFERRED EMBODIMENTS OF THE INVENTION

Figure 1:
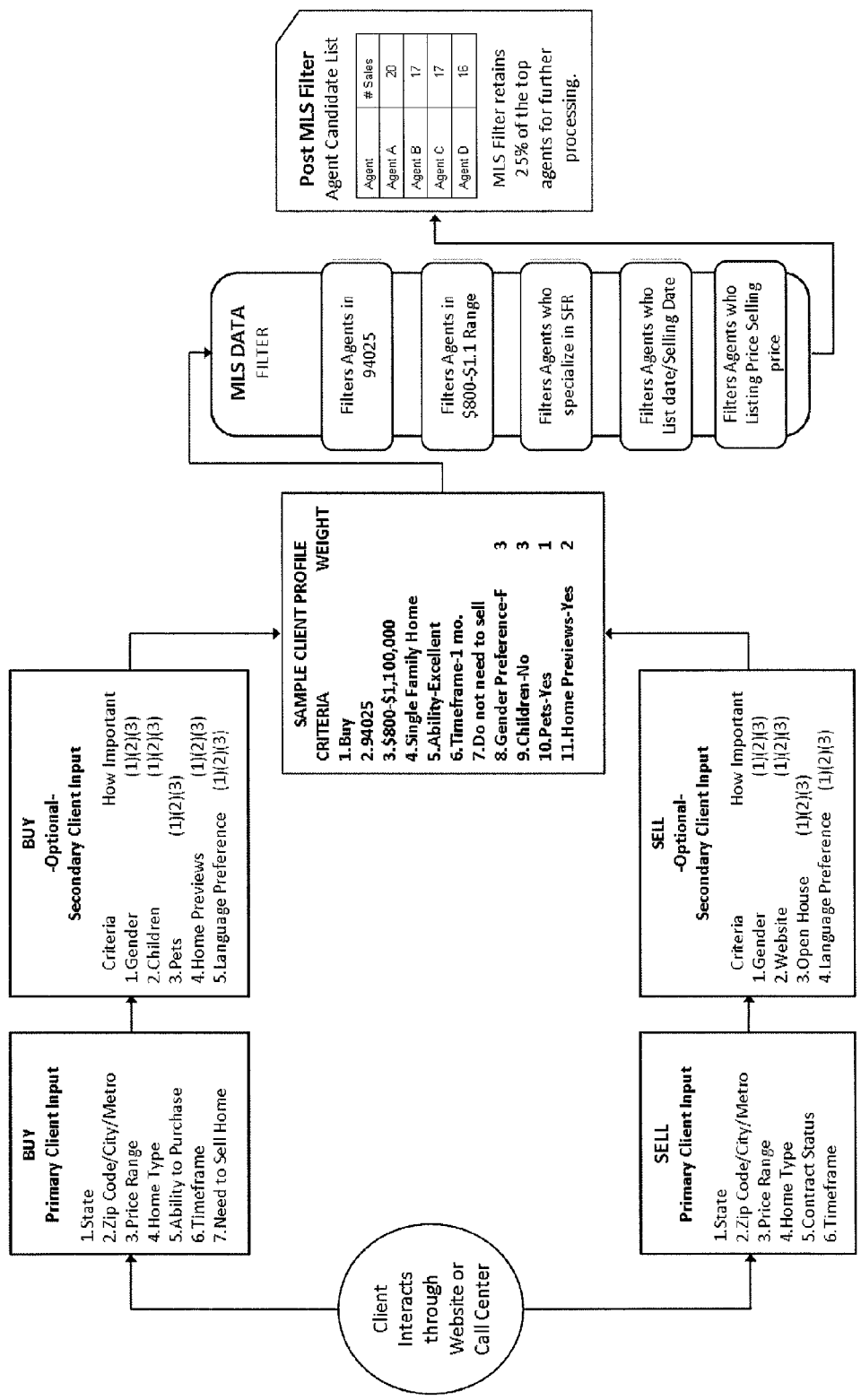
FIG. 1, is a flowchart depicting the process of ranking two or more real estate agents by filtering the performance data of two or more real estate agents in accordance with the present invention.

In accordance with the present invention there is provided a system and method for providing real estate agent referrals to potential buyers and sellers of real estate. The real estate referral method provides sellers and buyers with a referral to the highest ranking real estate agent available with respect to the specific property involved, the personal preferences of the buyer/seller, and/or the performance of the two or more real estate agents. The utilization of performance data for the two or more real estate agents provides an unbiased ranking based solely on performance of the two or more real estate agents. With such considerations being made during the referral process, a high performing real estate agent will be referred to the buyer/seller thereby enabling an effective real estate transaction.

The method in accordance with the present invention generally comprises the steps of 1) receiving information from a buyer or seller relating to the buyer's or seller's preferences and the type of real estate involved, 2) ranking two or more real estate agents based on the information received from the buyer or seller and performance data of the two or more real estate agents, and 3) providing a referral to the buyer or seller for the highest performing real estate agent based on availability. The ranking may be performed by filtering the performance data based on the initial information received from the buyer or seller. Alternatively, the ranking may be performed by performing a calculation based on the performance data of the two or more real estate agents and the initial information received from the potential buyer or seller. Once the real estate agents are ranked by filtering or calculations based on the performance data, the rankings of the real estate agents may be further refined based on the preferences of the buyer or seller to refer a real estate agent that is a better match with the buyer or seller. As such, the performance data may be considered the primary data for performing the ranking of the real estate agents and the preferences of the buyer or seller may be considered secondary data for performing the ranking of the two or more real estate agents.

To provide a referral to the buyer/seller, information regarding the property to be bought or sold and personal information must first be received from the buyer/seller. The property information may include one or more pieces of information such as the address of the property, type of property, current listing price of property, desired listing price, time property has been on the market, and the name of current property owner. The personal information from the buyer/seller may include one or more pieces of information such as full name, address, age, nationality, phone number, email address, and desired closing date. The information received from the buyer or seller may also include preferences of the buyer or seller regarding the type of real estate agent they are seeking. Some examples of personal preferences are fluency in a particular language, family status of the real estate agent, gender, ethnicity, age, and whether or not the real estate agent is a pet owner. The reason for acquiring such qualitative data from the buyer/seller is to create a comfort level between the buyer/seller and real estate agent and to provide a real estate agent who understands the preferences and needs of the buyer/seller. For instance, a buyer may have a large family and want the real estate agent representing them to understand the intricacies involved when purchasing a house for such a family of a certain size. As such, the buyer would want the agent to have personal experience that would mirror the current condition of the buyer such that all the needs of the buyer will be taken into account during the real estate transaction.

The information may be received from the buyer/seller either electronically or by hard copy. In the case of a hard copy, the buyer/seller may complete a form with all of the required information and submit to the referral service provider. In the case of electronically submitted information, the buyer/seller may fill out and submit an online form or email an electronic form to the referral service provider. The information may also be received from the buyer or seller via an interview which may take place in person, by telephone, or any other communication medium.

Upon providing the information to the referral service provider, the buyer/seller may also be required to sign an agreement with respect to the services offered. The agreement may include discussion of fees for the referral services and standard contractual terms regarding the services provided and limitations on liability. When collecting a fee from the buyer/seller, the referral service provider may collect a flat fee or a fee based on the price of the real estate property. The fee may be collected at the beginning of the transaction when receiving information from the buyer/seller, upon closing of the sale of the property, or at any time during the relationship between the referral service provider and the buyer/seller. As an alternative to collecting a fee from the buyer/seller, the referral service provider may elect to offer the services free to the buyer/seller and charge the fee to the referred real estate agent. When collecting a fee from the real estate agent, the fee charged by the referral service provider may be a flat fee, a fee based on the price of the real estate, or a percentage of the commission received by the real estate agent.

Once the buyer/seller information is received by the referral service provider, a follow-up communication may be performed by the referral service provider to the buyer/seller. The follow-up communication is performed to verify the data supplied by the buyer/seller, verify the buyer/seller is an actual person, and/or provide customer service to the buyer/seller. The follow-up communication may also be used to acquire some additional data from the buyer/seller with regard to the type of real estate agent the buyer/seller is seeking.

Once the property and personal information is received from the buyer/seller, the information is utilized to create a list of real estate agents who have experience which coincides with at least a portion of the information received from the buyer/seller. Real estate agents having performance data which matches at least some of the categorized data will be included and ranked based on their performance. The performance data utilized to rank the one or more real estate agents may be quantitative data and/or qualitative data. Some examples of quantitative data may include total volume of sales, sales of properties within given price ranges, time to effect a sale, number of years experience, and listing price versus selling price. Examples of qualitative data include type of property, feedback from clients, feedback from other real estate agents, and responsiveness. The performance data of the real estate agents may be acquired from a centralized database maintained by the referral service provider or any other source of performance information for the two or more real estate agents.

The initial ranking of the real estate agents based on performance data may be performed based on a calculation performed on the performance data and/or filtering of the performance data. After the initial ranking based on the performance data, the preferences of the buyer/seller may be used to further refine the rankings to consider specific preferences of the buyer or seller. When performing the ranking of the real estate agents by filtering, the agents may ultimately be ranked based on a single category, such as volume, after filtering based on various criteria. When ranking the real estate agents via a calculation based on the performance data, the two or more real estate agents may be ranked by selecting data in relation to the performance of the real estate agents from one or more categories of performance data and calculating a single value indicative of the performance of the real estate agents over a particular period of time and ranking the real estate agents based on the performance value.

When ranking the two or more real estate agents via filtering, the information initially received from the buyer or seller is used to filter the performance data of the two or more real estate agents. The number of filtering steps may vary based on the number of categories considered when ranking the real estate agents. During the filtering steps, real estate agents not having data in a particular category, may be removed from the list or moved to the bottom of the list. For instance, if a buyer is looking to purchase a residential property in the price range of $300,000 to $350,000, all of the available real estate agents having sold properties in that price range may be included into a list and initially ranked based on sales volume in the $300,000 to $350,000 price range. The list of real estate agents may then be further filtered based on the geographical region of the residential property such that real estate agents not having sold homes in a particular geographic region are removed or moved to the bottom of the list. The list may be further filtered based on other pieces of information (quantitative and qualitative) received from the buyer until a final list of potential real estate agents is acquired whereby all of the agents included in the list have at least some performance data that coincides with the personal and property information received from the buyer. After the filtering steps, the highest performing real estate agent based on volume in the $300,000 to $350,000 price range in a particular geographical region will be referred to the buyer based on availability. If the highest ranking real estate agent on the list is not available for the buyer/seller, the next highest ranking real estate agent will be considered for referral based on availability.

A flow chart depicting the process of ranking two or more real estate agents by filtering the performance data of two or more real estate agents is shown in FIG. 1. In the process shown in FIG. 1, the filtering may be performed based on the geographical region (94025 zip code), price range ($800,000 to $1,100,000), type of property (single family residence), listing time, and difference between listing and selling price.

In the above examples, the main category used to rank the two or more real estate agents is volume. The main category may vary as desired based on the type of transaction involved. For instance, it may be desirable to find a real estate agent with the shortest listing time in the case of a seller who needs to quickly sell a property. In such case, the two or more real estate agents may initially be ranked based on the average listing time of the properties. The list may be further filtered based on other categories such as type of property, price range of property, geographical region, and listing price versus selling price. Upon completion of the filtering steps, the highest performing real estate agent with respect to shortest listing time will be referred to the seller based on availability.

To rank the real estate agents by performing a calculation based on the performance data, the information received from the buyer/seller, may be used to assist selection of the categories of information used to calculate the single value indicative of the performance of the two or more real estate agents by performance. The final value indicative of the performance of the real estate agents may be calculated by performing a calculation based on the selected categories of performance data. The data used to make the calculation may be quantitative data and/or qualitative data. In the case of qualitative data, numerical values may be assigned to certain pieces of qualitative data based on the type of information. Weighting may also be used to assign a numerical value to the qualitative data or modify the numerical value assigned to the qualitative data. The quantitative data may also weighted based on the importance of the type of information. Various weighting values may be assigned to the fields based on the importance of a particular field in relation to the transaction for which the referral is received. Along with the initial information received from the buyer/seller, the buyer/seller may also provide weighting values based on the importance of certain factors involved in the real estate transaction, such values being used by the algorithm when performing the calculation. Upon completion of the calculation, the highest performing real estate agent with respect to the calculated performance value will be referred to the seller based on availability.

Figure 2:
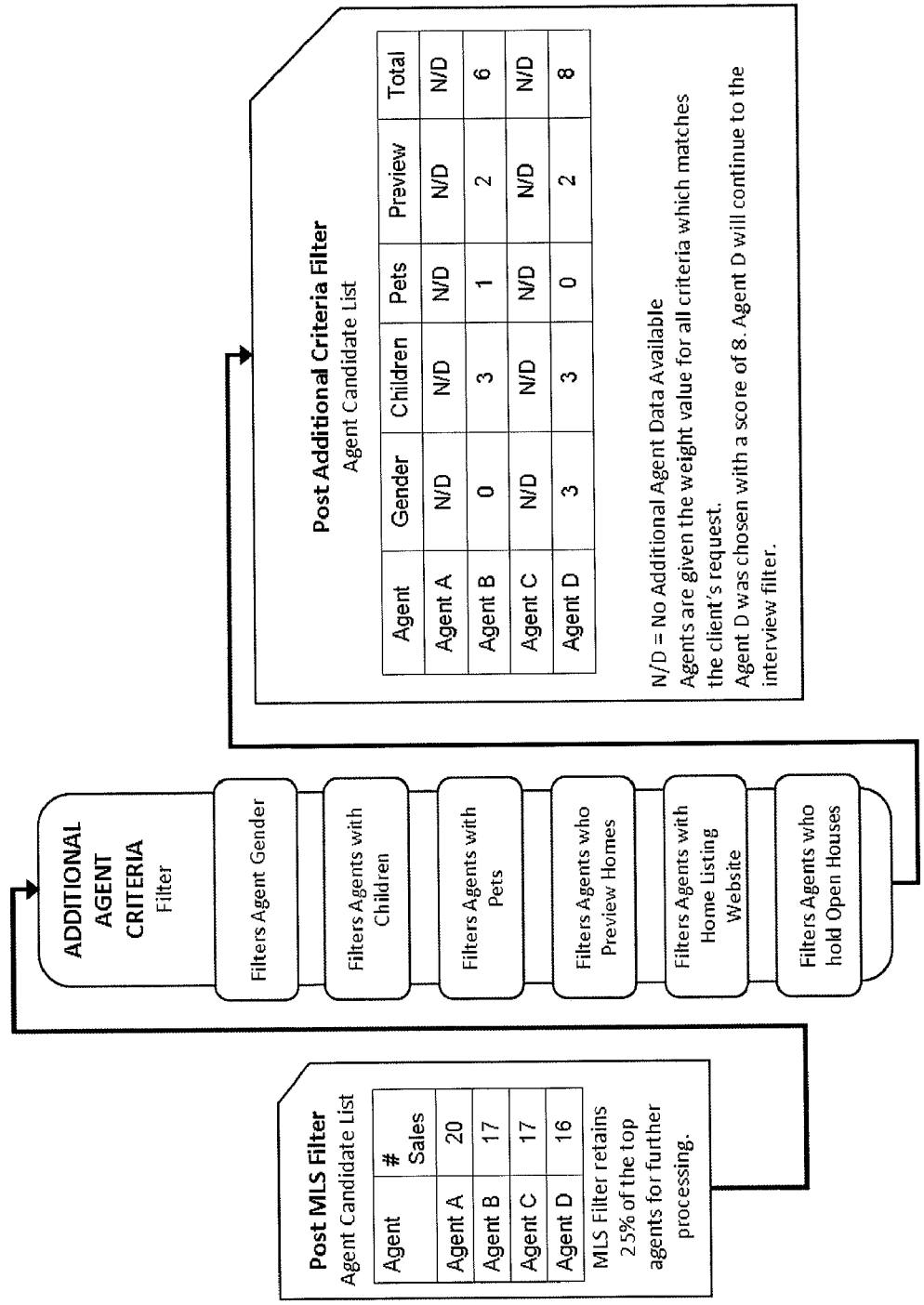
FIG. 2, is flowchart generally depicting the process for using the preferences of the buyer or seller to refine the real estate agent performance rankings in accordance with the present invention.

Once the real estate agents have been ranked based on the performance data of the real estate agents, the preferences of the buyer or seller may be used to further refine the rankings to select a real estate agent that is a better match with the buyer or seller. A flow chart generally depicting the process for using the preferences of the buyer or seller to refine the real estate agent performance rankings is shown in FIG. 2. The refinement may be performed by an algorithm in which calculates a value indicative of how well the characteristics of the real estate agent match the preferences of the buyer or seller. The algorithm may weight certain preferences of the user as some preferences may be more important than others. In order to perform the calculation, information is received from the buyer/seller regarding the preferences of the buyer/seller. The information may be received by asking the buyer/seller a predetermined number of questions regarding buyer/seller preferences and have the buyer/seller rate the questions. For example, ratings in the range of 1 (low) to 5 (high) based on importance of agent characteristics to the buyer/seller may be used to provide a preference rating (PR) for each questions. The ratings may vary as needed and may include a range, for example, of 1 to 10, 1 to 50, 1 to 100 and so on. For purposes of the present example, the total number of predetermined questions is five. The number of predetermined questions asking the preferences of the buyer or seller may be one or more. Based on the present example, the ratings (1 to 5) for each of the questions are added together to provide a total preference rating. Each question is then compared to the characteristics of each potential real estate agent to provide an agent preference rating. When the agent characteristic matches the preferences of the buyer/seller, the potential agent is assigned an agent characteristic value (ACV) of 1 for the particular question. When the agent characteristic does not match the preferences of the buyer/seller, the potential agent is assigned an agent characteristic value (ACV) of 0 for the particular question. The preference matching value (PMV) may be calculated based on the following equation:

$$PMV = \frac{(PR_1 * ACV_1) + (PR_2 * ACV_2) + (PR_3 * ACV_3) + \ldots + (PR_z * ACV_z)}{PR_1 + PR_2 + PR_3 + \ldots + PR_z},$$

where z is equal to the number of preferences provided by the buyer or seller. When used in accordance with the present example whereby 5 preferences of the buyer or seller are provided, z would be equal to 5 resulting in the following equation:

$$PMV = \frac{(PR_1 * ACV_1) + (PR_2 * ACV_2) + (PR_3 * ACV_3) + (PR_4 * ACV_4) + (PR_5 * ACV_5)}{PR_1 + PR_2 + PR_3 + PR_4 + PR_5}$$

The performance matching value may then be used to refine the rankings based on performance data. The performance matching value may be multiplied by the rankings to provide a refined agent ranking which ranks the real estate agents by performance while considering the preferences of the buyer/seller. Alternatively, the preference matching value (PMV) may be a percentage which represents the percentage of characteristics of the real estate agent which match the preferences of the buyer or seller. In such case, the percentage is multiplied by the all of the given values to provide a new ranking value for each ranked real estate agent resulting in refined rankings of the real estate agents.

For purposes of providing an unbiased ranking based on performance of the two or more real estate agents, the primary data, or the actual performance data of the real estate agent, preferably takes priority over the secondary data, or preferences of the buyer or seller. To ensure that the performance data takes priority over the buyer/seller preferences, the refinement of the data based on the buyer/seller preferences may only be performed on a certain percentage of the ranked real estate agents. For instance, after performing the ranking based on performance data, the top 25% of the agents may be selected and their rankings may be refined based on the preferences of the buyer or seller. Such percentages may be in the range of 1% to 99%. Preferably, the percentage is in the range of 5% to 50%, more preferably in the range of 10% to 25%.

Figure 3:
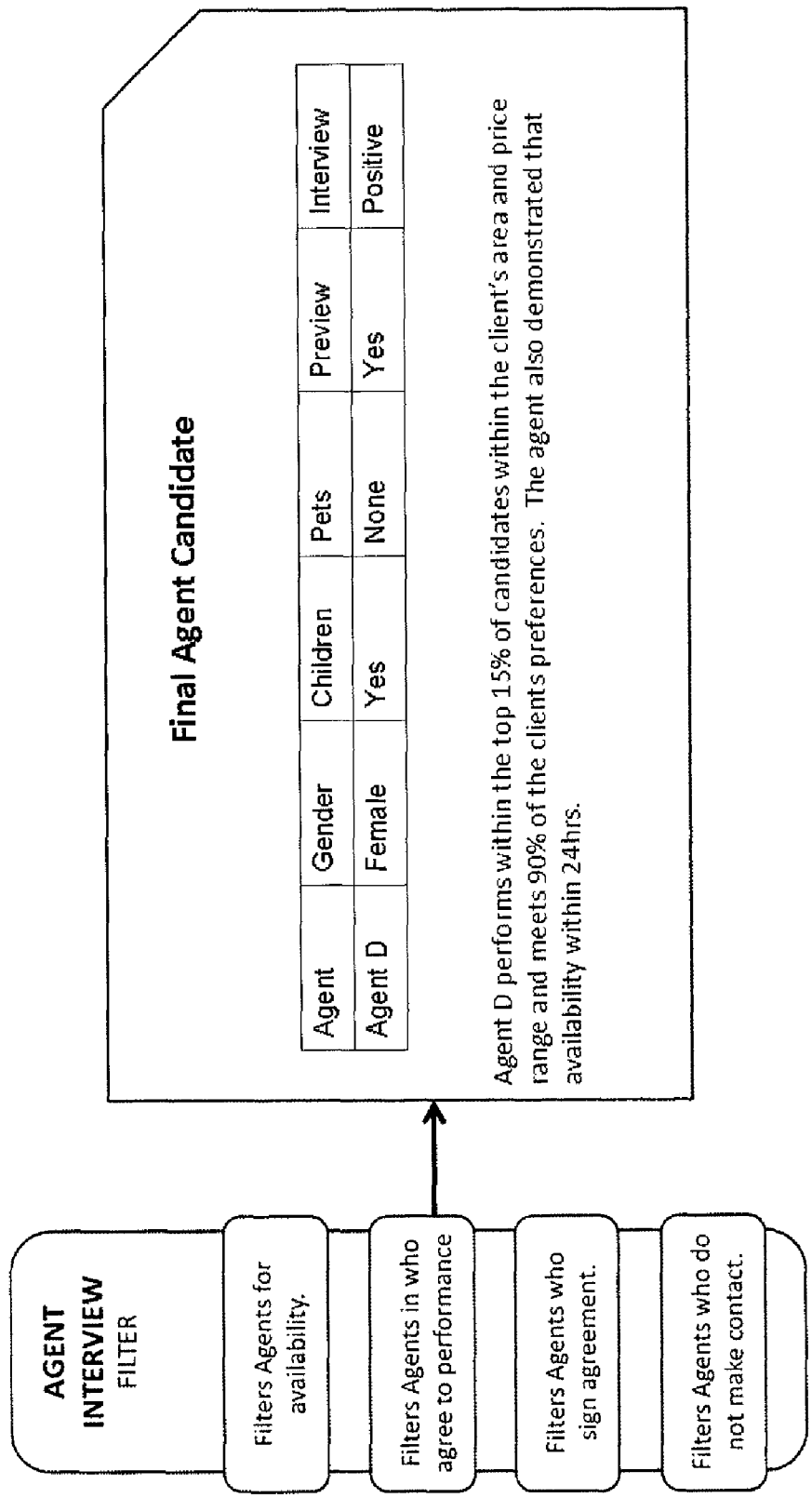
FIG. 3, is a flowchart depicting the agent interview filtering process in accordance with the present invention.

After ranking the two or more real estate agents, an agent interview filter may be used to confirm additional information prior to providing the referral of the real estate agent to the buyer or seller. Examples of information that may be confirmed by the agent interview filter include availability of the agent, willingness of agent to enter into agreement with referral service provider, willingness of agent to perform service, and responsiveness of agent. Agents who do not meet one or more criteria in the agent interview filter may be removed from consideration or moved down on the list of potential real estate agents. The agent interview filter may be performed by telephone interview, face to face interview, email communications, or any other type of communication. A flow chart depicting the agent interview filtering process is shown in FIG. 3.

Figure 4:
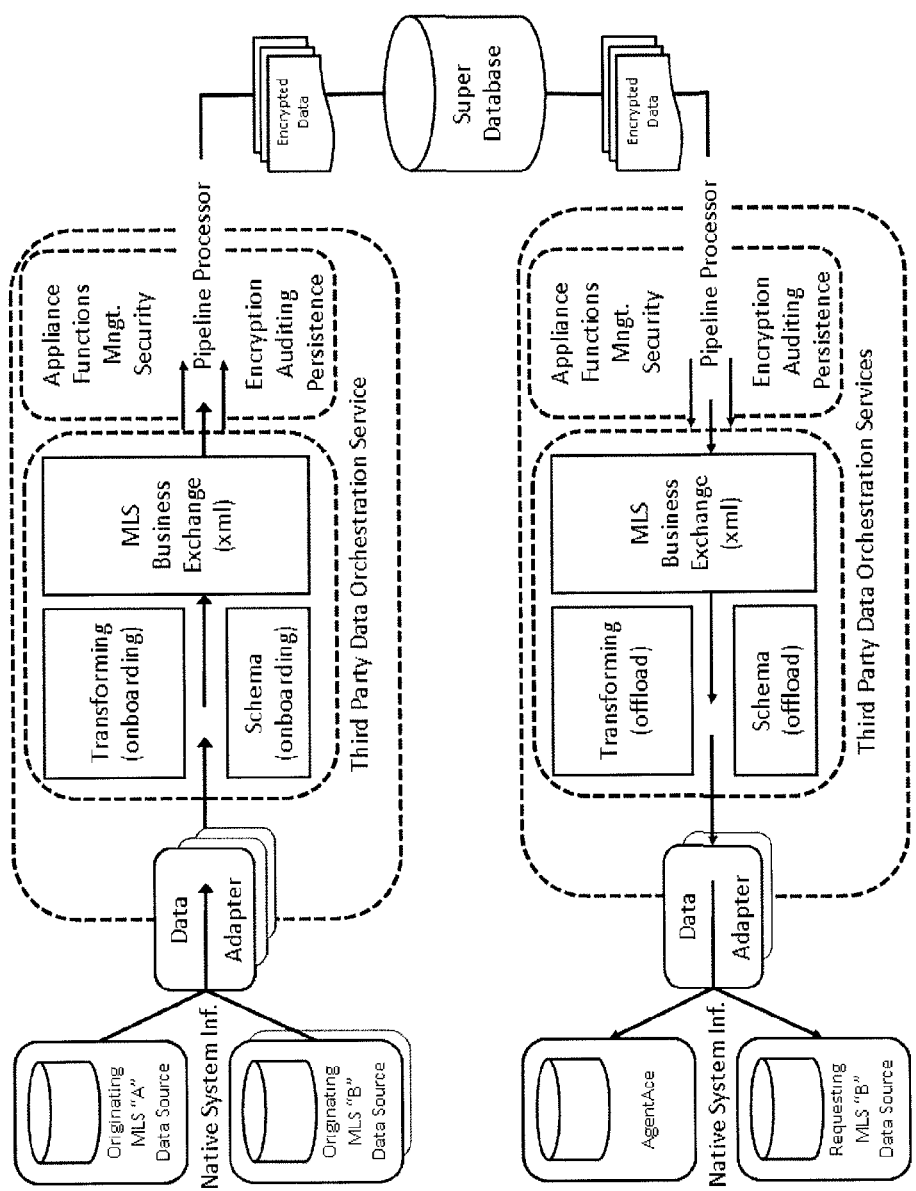
FIG. 4, is a flowchart depicting the process for acquiring real estate agent performance data in accordance with the present invention.

The performance data used to rank the two or more real estate agents may be acquired from real estate databases, surveys, interviews, websites, public records and any other source of real estate agent information. FIG. 4, generally depicts the process for acquiring real estate agent performance data in accordance with the present invention. Once acquired, all of the real estate agent information may be maintained in a central database with continual updating as needed. Real estate agents may continue to be added to or removed from the centralized database as needed. A centralized database will increase the accessibility of the data for future use, as it is often difficult to acquire real estate data from multiple sources as needed on a timely basis. Use of a centralized database may be avoided if a single source of data or two or more compatible databases may be utilized to provide all of the necessary performance data required to perform the ranking of the two or more real estate agents.

A primary example of a real estate database that may provide performance information to rank the two or more real estate agents is the MLS system. The MLS system includes information such as area, price range, volume, type of property, listing/selling price, and listing/selling date. The MLS system comprises many separate databases located in different geographical regions. The MLS system may provide data in a typical database format, a spreadsheet format, or a website format. Data may be received from the databases by 1) being granted full access to download data, 2) being granted access upon periodic entry of a randomly generated security code, 3) being sent files which include the database information, and 4) website access whereby a designated number of files may be viewed/downloaded at a specific time. Based on these different types of formats, the various MLS databases are typically not compatible with one another preventing data from being shared between databases.

With the databases being typically incompatible with one another, a data extraction adapter may be utilized to interface with and extract the necessary information from each MLS database. The data extraction adapter is created based on the database or files with which it is needed to interface. Due to the difference in formats and language between databases and files, a separate data extraction adapter may need to be used for each MLS database or file. While in most cases a separate data extraction adapter is required for each system, a single extraction adapter may be used for multiple databases or files which use the same or similar formats for data storage. When granted full access or limited access to a MLS database, the data extraction adapter typically plugs into the backend of the MLS database and interfaces with the database to extract MLS data on a real time basis. In addition to extracting data from each MLS database, the data extraction adapter may be configured to provide data to and populate the MLS database to which it is interfaced with. When interfacing with data contained in files or databases the data extraction adapter is configured to map and extract the data from various locations within the file or database.

Upon extraction of the data from the one or more real estate databases and/or files, the data may be normalized into a common format via data normalization software. To assist in normalization of the extracted data, the data extraction adapters may format the data into a format recognized by data normalization software. One example of data normalization software is SOA Expressway as available from Intel Corporation. Once the data is normalized into a common format, the normalized data may then be encrypted and stored into a central database. The common format of the stored data may be any typical data format known in the art or may alternatively be a specially customized format. Additional data collected from other sources such as surveys, real estate databases, interviews, websites, public records and any other source of real estate agent information may also be added to the centralized database and stored in the same format as the normalized data.

In addition to being used for ranking of real estate agents and providing referrals, the data stored in the centralized database may be provided to other entities having the need for such information. One use of the data may be to populate/update other databases. For instance, with many different MLS databases being included in the MLS system, data from one MLS database cannot be easily shared with another database due to the MLS databases typically using different formats for data storage. The data from the centralized database may be used to populate/update the separate MLS databases regardless of the format of the MLS databases. The various MLS databases may be easily populated/updated with the information from the centralized database by utilizing the data extraction adapters which are configured to interface with the databases. The separate MLS databases may then be populated/updated on a real-time basis or as required. The information in the centralized database may also be provided to entities having a need for certain real estate information. Examples of such entities are financial institutions, home improvement retailers, construction companies, governmental institutions and the like. The owner of the centralized database may charge a fee for the information. The fee may be charged on a subscription basis or a fee per record basis.

While there have been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

The invention claimed is:

1. A method for referring a real estate agent comprising the steps of:
    receiving information from a buyer or seller of a real estate property, wherein the information received from the buyer or seller comprises the geographic area of the property to be purchased or sold, the price range of the property to be purchased or sold, and personal information of the buyer or seller;
    receiving performance data for two or more real estate agents;
    ranking by a computer two or more real estate agents based on one or more types of the information received from the buyer or seller and the performance data of the two or more real estate agents, wherein the rankings of the two or more real estate agents are refined by the computer by calculating a performance matching value for each of said two or more ranked real estate agent indicative of how well the characteristics of the two or more ranked real estate agents match the information from the buyer or seller, and refining the ranking of each real estate agent with the performance matching value to provide a new ranking of real estate agents; and
    providing a referral to the buyer or seller for the highest ranking real estate agent based on availability.

2. The method according to claim 1, wherein the information received from the buyer or seller further comprises one or more types of data selected from the type of property, time property has been on the market, the name of current property owner, full name of buyer or seller, address of buyer or seller, age of buyer or seller, nationality of buyer or seller, phone number of buyer or seller, email address of buyer or seller, and desired closing date.

3. The method according to claim 1, wherein said performance data comprises one or more types of data selected from volume of sales, listing time for properties, listing price versus selling price for the properties handled by said one or more real estate agents, number of years of experience, type of property, feedback from clients, feedback from other real estate agents, and responsiveness.

4. The method according to claim 1, wherein said information from the buyer or seller further comprises the preferences of the buyer or seller regarding the type of real estate agent to be referred to the buyer or the seller.

5. The method according to claim 4, wherein the preferences of the buyer or seller comprise one or more selected from fluency of real estate agent in a particular language, family status of the real estate agent, gender of the real estate agent, ethnicity of the real estate agent, age of the real estate agent, and whether or not the real estate agent is a pet owner.

6. The method according to claim 1, wherein the performance matching value is a percentage representing the percentage of characteristics of the real estate agent which match the preferences of the buyer or seller.

7. The method according to claim 1, further comprising the step of:
utilizing an agent interview filter prior to providing the referral to the buyer or seller, said agent interview filter confirming one or more types of information selected from availability of the agent, willingness of agent to enter into agreement with referral service provider, willingness of agent to perform service, and responsiveness of agent.

8. A method for referring a real estate agent comprising the steps of:
receiving information from a buyer or seller of a real estate property, wherein the information received from the buyer or seller comprises the geographic area of the property to be purchased or sold, the price range of the property to be purchased or sold, and personal information of the buyer or seller;
receiving performance data for two or more real estate agents;
ranking by a computer two or more real estate agents based on one or more types of the information received from the buyer or seller and the performance data of the two or more real estate agents, wherein the rankings of the two or more real estate agents are refined by the computer by weighting the rankings of the two or more real estate agents based on how well the characteristics of said two or more real estate agents match the information received from the buyer or seller to provide a new ranking of real estate agents; and
providing a referral to the buyer or seller for the highest ranking real estate agent based on availability.

9. The method according to claim 8, wherein the information received from the buyer or seller further comprises one or more types of data selected from the type of property, time property has been on the market, the name of current property owner, full name of buyer or seller, address of buyer or seller, age of buyer or seller, nationality of buyer or seller, phone number of buyer or seller, email address of buyer or seller, and desired closing date.

10. The method according to claim 8, wherein said performance data comprises one or more types of data selected from volume of sales, listing time for properties, listing price versus selling price for the properties handled by said one or more real estate agents, number of years of experience, type of property, feedback from clients, feedback from other real estate agents, and responsiveness.

11. The method according to claim 8, wherein said information from the buyer or seller further comprises the preferences of the buyer or seller regarding the type of real estate agent to be referred to the buyer or the seller.

12. The method according to claim 11, wherein the preferences of the buyer or seller comprise one or more selected from fluency of real estate agent in a particular language, family status of the real estate agent, gender of the real estate agent, ethnicity of the real estate agent, age of the real estate agent, and whether or not the real estate agent is a pet owner.

13. The method according to claim 8, further comprising the step of:
utilizing an agent interview filter prior to providing the referral to the buyer or seller, said agent interview filter confirming one or more types of information selected from availability of the agent, willingness of agent to enter into agreement with referral service provider, willingness of agent to perform service, and responsiveness of agent.

14. A method for referring a real estate agent comprising the steps of:
receiving information from a buyer or seller of a real estate property, wherein the information received from the buyer or seller comprises the geographic area of the property to be purchased or sold, the price range of the property to be purchased or sold, and personal information of the buyer or seller;
receiving performance data for two or more real estate agents;
calculating by a computer a performance matching value for each of the two or more real estate agents indicative of how well the characteristics of each of the two or more real estate agents match the information from the buyer or seller;
refining by the computer the performance data of the two or more real estate agents with the performance matching value to obtain a ranking of the two or more real estate agents; and
providing a referral to the buyer or seller for the highest ranking real estate agent based on availability.

15. The method according to claim 14, wherein the information received from the buyer or seller further comprises one or more types of data selected from the type of property, time property has been on the market, the name of current property owner, full name of buyer or seller, address of buyer or seller, age of buyer or seller, nationality of buyer or seller, phone number of buyer or seller, email address of buyer or seller, and desired closing date.

16. The method according to claim 14, wherein said performance data comprises one or more types of data selected from volume of sales, listing time for properties, listing price versus selling price for the properties handled by said one or more real estate agents, number of years of experience, type of property, feedback from clients, feedback from other real estate agents, and responsiveness.

17. The method according to claim 14, wherein said information from the buyer or seller further comprises the preferences of the buyer or seller regarding the type of real estate agent to be referred to the buyer or the seller.

18. The method according to claim 17, wherein the preferences of the buyer or seller comprise one or more selected from fluency of real estate agent in a particular language, family status of the real estate agent, gender of the real estate agent, ethnicity of the real estate agent, age of the real estate agent, and whether or not the real estate agent is a pet owner.

19. The method according to claim 14, wherein the performance matching value is a percentage representing the percentage of characteristics of the real estate agent which match the preferences of the buyer or seller.

20. The method according to claim 14, further comprising the step of:
utilizing an agent interview filter prior to providing the referral to the buyer or seller, said agent interview filter confirming one or more types of information selected from availability of the agent, willingness of agent to enter into agreement with referral service provider, willingness of agent to perform service, and responsiveness of agent.

21. A method for referring a real estate agent comprising the steps of:
receiving information from a buyer or seller of a real estate property, wherein the information received from the buyer or seller comprises the geographic area of the property to be purchased or sold, the price range of the property to be purchased or sold, and personal information of the buyer or seller;
receiving performance data for two or more real estate agents;
calculating by a computer a performance matching value for each of the two or more real estate agents indicative of how well the characteristics of each of the two or more real estate agents match the information from the buyer or seller;
providing a ranking of said two or more real estate agents whereby the ranking of said two or more real estate agents is created by refining by the computer the performance data of the two or more real estate agents with the performance matching value to obtain a ranking of the two or more real estate agents.

22. The method according to claim 21, wherein the information received from the buyer or seller further comprises one or more types of data selected from the type of property, time property has been on the market, the name of current property owner, full name of buyer or seller, address of buyer or seller, age of buyer or seller, nationality of buyer or seller, phone number of buyer or seller, email address of buyer or seller, and desired closing date.

23. The method according to claim 21, wherein said performance data comprises one or more types of data selected from volume of sales, listing time for properties, listing price versus selling price for the properties handled by said one or more real estate agents, number of years of experience, type of property, feedback from clients, feedback from other real estate agents, and responsiveness.

24. The method according to claim 21, wherein said information from the buyer or seller further comprises the preferences of the buyer or seller regarding the type of real estate agent to be referred to the buyer or the seller.

25. The method according to claim 24, wherein the preferences of the buyer or seller comprise one or more selected from fluency of real estate agent in a particular language, family status of the real estate agent, gender of the real estate agent, ethnicity of the real estate agent, age of the real estate agent, and whether or not the real estate agent is a pet owner.

26. The method according to claim 21, wherein the performance matching value is a percentage representing the percentage of characteristics of the real estate agent which match the preferences of the buyer or seller.

* * * * *